United States Patent
Ilijas

(10) Patent No.: US 6,199,807 B1
(45) Date of Patent: Mar. 13, 2001

(54) SUPPORT STAND

(76) Inventor: Hilary Z. Ilijas, 21 Tarlton Road, Toronto, Ontario (CA), M5P 2M6

(*) Notice: Subject to any disclaimer, the term of this patent is extended or adjusted under 35 U.S.C. 154(b) by 0 days.

(21) Appl. No.: 09/410,077

(22) Filed: Oct. 1, 1999

(51) Int. Cl.[7] .................................................. F16M 11/00
(52) U.S. Cl. .................................... 248/163.1; 108/50.02; 248/188
(58) Field of Search .............................. 248/163.1, 432, 248/188, 188.7, 188.8, 913, 164, 431, 168; 108/50.02, 153.1, 64, 50.01, 180; 52/220.7, 239, 36.1

(56) References Cited

U.S. PATENT DOCUMENTS

| | | | |
|---|---|---|---|
| 471,424 | * | 3/1892 | Hov ....................... 248/163.1 |
| 4,073,484 | * | 2/1978 | Keekenkamp ................. 269/321 |
| 4,287,837 | * | 9/1981 | Bayles ....................... 248/188 |
| 4,469,029 | * | 9/1984 | Ramond ..................... 108/99 X |
| 4,604,955 | * | 8/1986 | Fleischer et al. ............... 108/147 |
| 4,757,849 | * | 7/1988 | Morris ....................... 108/97 X |
| 5,086,710 | * | 2/1992 | Korb ........................... 108/4 |
| 5,186,425 | * | 2/1993 | Keusch et al. ................ 248/188.1 |
| 5,237,935 | * | 8/1993 | Newhouse et al. ................ 108/50 |
| 5,320,150 | * | 6/1994 | Everts et al. ................... 144/287 |
| 5,752,449 | * | 5/1998 | Simon et al. .................. 108/50.02 |
| 5,901,513 | * | 5/1999 | Mollenkopf et al. ............... 52/220.7 |
| 6,024,024 | * | 2/2000 | Favaretto ....................... 108/64 |

* cited by examiner

Primary Examiner—Leslie A. Braun
Assistant Examiner—Tan Le

(57) ABSTRACT

The present invention is directed to a support stand which is economical to manufacture. The support stand comprises at least two support legs for the support stand. Each of the support legs comprises a generally vertical central portion with top member supporting extensions extending from either side of a first end of the generally vertical central portion. The support legs are provided with surface engaging means, extending either side of the second end of the generally vertical central portion. The support stand also includes a top member which provides the support surface of the support stand. The top member has a first section having engaging means at or adjacent either end thereof for engaging with the top member supporting extensions of the support leg. The top member is also provided with a second section attached along an edge to the first section. The second section is orientated to lie in a plane with the generally vertical central portion when the engaging means are engaged with the laterally extending extensions of the support legs. Two such top members are utilized, one of the top members engaging the top member supporting extension on one side of each of the support legs. The other top member engages the top member supporting extensions of the second side of each of the support legs. When the top members are engaged with the support legs, the two second sections abut one another along their surfaces, and may be releasably connected to one another to provide for lateral support for the support stand.

12 Claims, 7 Drawing Sheets

SUPPORT STAND

FIELD OF THE INVENTION

The present invention relates to a novel, easy to construct support stand.

BACKGROUND OF THE INVENTION

There are many different types of support stands in common use, such as tables, benches, display rack, or support stands for holding tools, work pieces or other structures which must be supported. Many such support stands are constructed of a plurality of different shaped pieces, each of which must be manufactured separately and then assembled to form the final support stand. The use of this plurality of pieces, each requiring a separate manufacturing step, increases the cost of production of the support stand and hence the cost to the final consumer.

SUMMARY OF THE INVENTION

The present invention is directed to a support stand which is economical to manufacture. The support stand comprises at least two support legs for the support stand. Each of the support legs comprises a generally vertical central portion with top member supporting extension, extending outwardly from either side of a first end of the generally vertical central portion. The support legs are provided with surface engaging means, extending either side of the second end of the generally vertical central portion. The support stand also includes a top member which provides the support surface of the support stand. The top member has a first section having engaging means on either end thereof for engaging with the top member supporting extensions of the support leg. The top member is also provided with a second section attached along an edge to the first section. The second section is orientated to lie in a plane with the generally vertical central portion when the engaging means are engaged with the top member supporting extensions of the support legs. Two such top members are utilized, each top member engaging the top member supporting extension of one side of each of the support legs. The other top member engages the top member supporting extensions of the second side of each of the support legs. When the top members are engaged with the support legs, the two second sections abut one another along their surfaces, and may be releasably connected to one another to provide for lateral support for the support stand.

In an aspect of the invention, the support legs are each comprised of two support members being co-joined to form the support leg for the support stand. Each of the support members comprises a generally vertical central portion with top member supporting extensions, extending angularity from the ends of the central support section. The support members are co-joined by joining the vertical central portions to one another to result in the top member supporting extensions, extending either side of the joined vertical central portions.

BRIEF DESCRIPTION OF THE DRAWINGS

Preferred embodiments of the present invention are illustrated in the attached drawings, wherein.

DETAILED DESCRIPTION OF THE PREFERRED EMBODIMENTS

Figure 1:
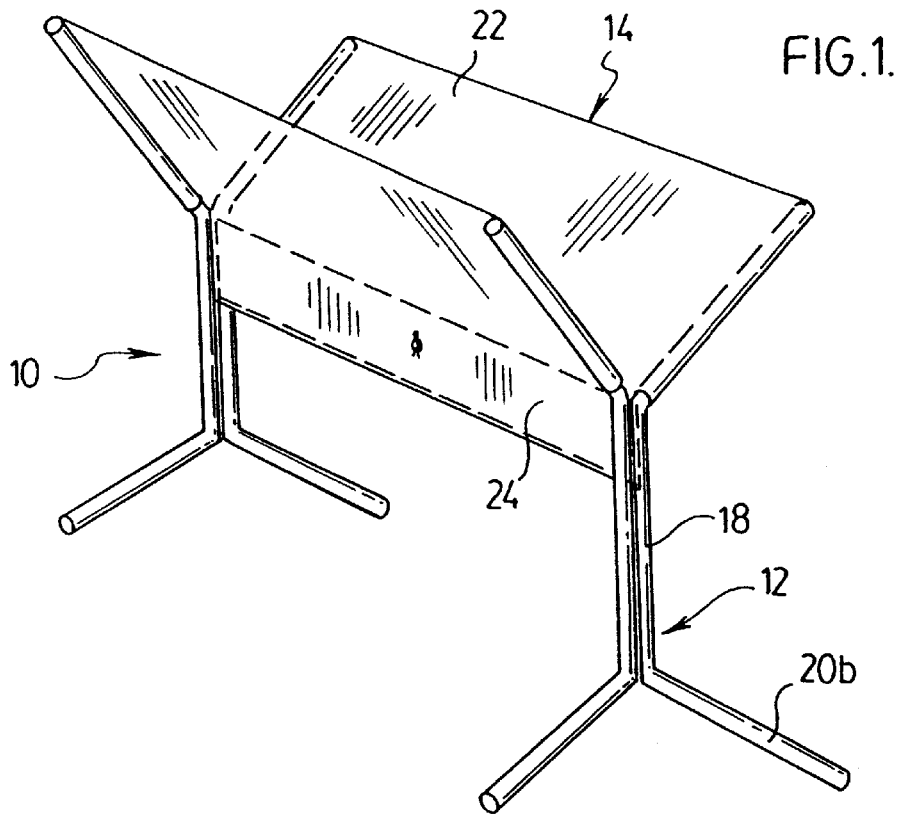
FIG. 1 is a perspective view of a first embodiment of a support stand according to the present invention.
Figure 2:
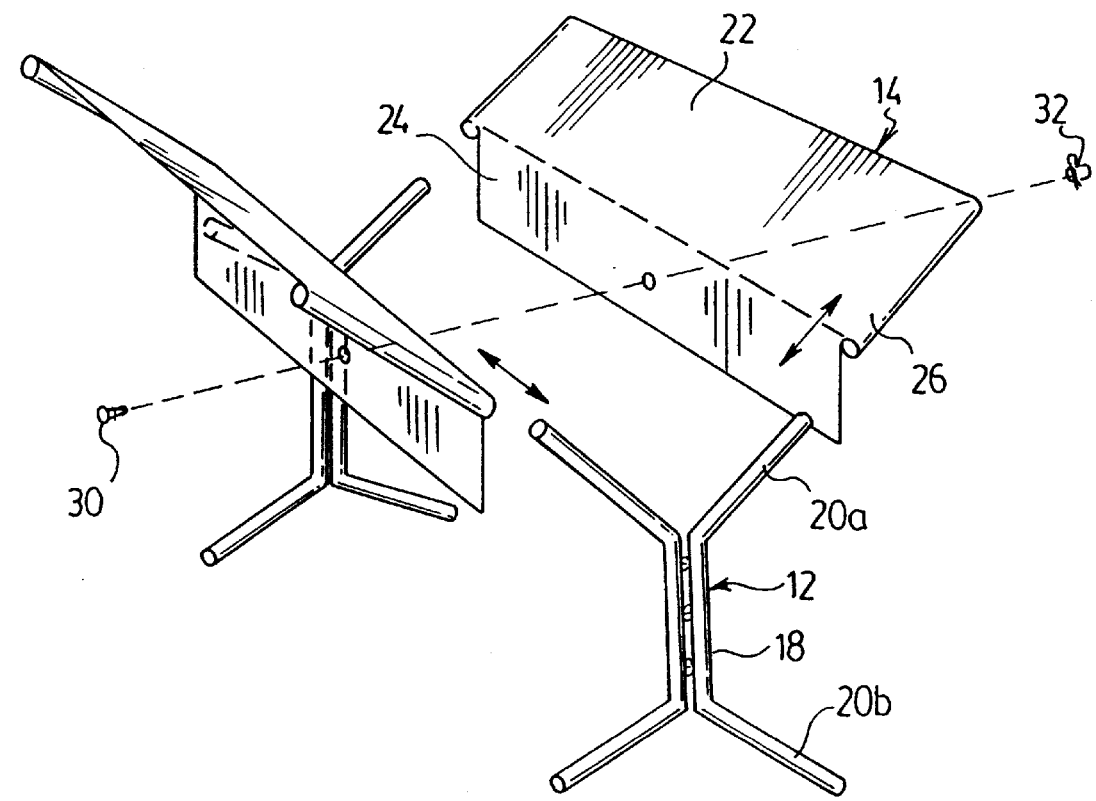
FIG. 2 is an exploded perspective view of the support stand of FIG. 1.

A first preferred embodiment of a support stand according to the present invention is illustrated in FIGS. 1 to 5, generally indicated by the numeral 10. The support stand 10 has two support legs 12 preferably located at either end of the support stand. Bridging the two support legs 12 are top members 14 which provide for the top support surface of the support stand 10, as well as providing for lateral support for the support stand 10 as will be described herein below. In this embodiment, each of the support legs 12 are comprised of a pair of support members 16, joined to one another. Support members 16 have a generally vertical central portion 18 which is utilized to join the two support members 16 to one another. Extending from either end of the vertical central portion 18 of the support member 16 are laterally extending extensions 20a and 20b. The laterally extending extensions 20a and 20b extend angularity away from the ends of the vertical central portion 18. When the two support members 16 are joined to one another to form the support leg 12, the laterally extending extensions 20a and 20b extend to either side of the co-joined vertical central portions 18.

The support stand 10, as described above, also includes a top member 14 for providing the top surface of the support stand 10. As illustrated in the figures in the preferred embodiments, the support stand 10 includes two such top members 14. The top members 14 have a first section 22 for forming the top surface of the assembled support stand 10. In the embodiment illustrated, the first section 22 of the top member 14 is generally planar, however, depending upon the use for the support stand, other shaping of the top member 14 may be employed, as will be described herein below. The top member 14 has a second section 24 connected along one edge to an edge of the first section 22. The angle between the first section 22 and second section 24 is preferably identical to the angle between the vertical central portion 18 of the support member 16 and the laterally extending top member supporting extension 20a, the purpose of which will be described herein below. The top member 14 is also provided with engaging means 26 on either end of the first section 22 for engaging with the laterally extending top member supporting extensions 20a of the support leg 12. In the embodiment illustrated, the support leg 12 is generally circular in cross-section, and thus the engaging means 26 of the top member 14 is a generally circular sleeve, capable of sliding over the top member supporting extension 20a and containing the top member supporting extension 20a within the interior of the circular sleeve.

The assembly of the support stand 10 of the first embodiment of the present invention will now be described in conjunction with the attached figures. The support legs 12 are assembled by co-joining the two support members 16 along their vertical central portions 18. This joining of the two support members 16 may be accomplished by mechanical or chemical fastening. For example, the two support members 16 may be permanently attached to one another by welding or gluing together the two central portions 18 to form the support leg 12. Alternatively, the support members 16 may be releasably mechanically fastened to one another by providing suitable bolts and nuts which would extend through holes provided in the vertical central portion 18 to join the two members 16 to one another. Once the support legs 12 are formed, the top member 14 is slidingly engaged with the support leg 12 by inserting the top member supporting extensions 20a into the engaging means 26. This is continued until both top members 14 have been engaged with both support legs 12, and the second sections 24 abut one another along their surfaces. The second sections 24 are then releasably connected together, for example by use of a suitable bolt 30 and nut 32 arrangement with the bolt 30 passing through holes provided in the second section 24, as illustrated in the figures. The joining together of the two second sections 24 provides lateral support to the support stand 10 without the necessity of a separate or individual piece.

The support stand 10 of the present invention may be utilized to form any stand necessary for supporting an object, such as for example a rack, a table, a support stand for work pieces or tools, benches, etc. The support stand may be utilized in many different situations, such as residential, institutional, factory, commercial establishments, etc. The support stand may also be utilized in hospitals to provide for additional beds, should the need arise.

Figure 3:
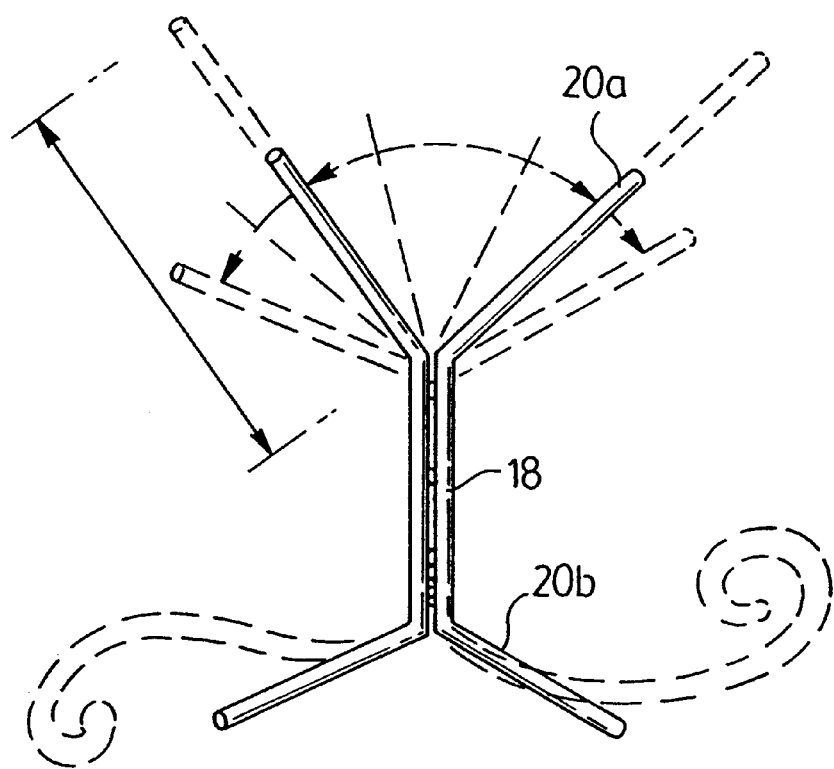
FIG. 3 is a side elevation view of the support leg of the support and of FIG. 1 illustrating variations in the support legs.

The angle between the vertical central portion 18 and top member supporting extensions 20a of the support member 16 may be varied, depending upon the application for which the support stand 10 is to be employed. As illustrated in FIG. 3, there may be a wide variation in this angularity, anywhere from a generally perpendicular angle between the vertical central portion 18 and the top member supporting extension 20a to provide for a generally flat table top, to a situation where one of the top member supporting extensions 20a of one of the support members 16 may be only bent outwardly slightly, while the top member supporting extension 20a of the second support member 16 would be bent at an angle close to perpendicular to provide for a bench for seating. Other such angles are contemplated, depending upon the application to which the support stand is to be placed. In addition, depending upon the application, the central portion may vary from the generally vertical orientation. Thus for appearance or to project the top surface further away from the support legs, the orientation of the central portion may be less vertical. In these situations, the angles between the first and second sections of the top members are also adjusted to maintain the second section in alignment with the central portion of the support legs. As also illustrated in FIG. 3, the laterally extending extension 20b forming the portion of the support leg 12, which rests on the surface, may be altered to provide for decorative features, as well as functional features.

Figure 4:
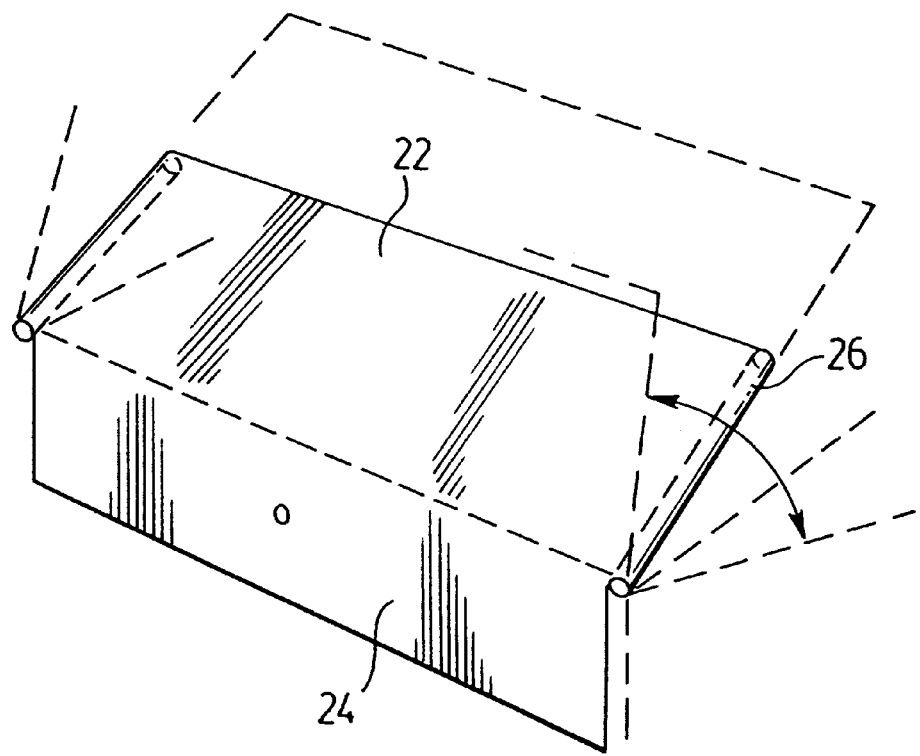
FIG. 4 is a perspective view of the top member of the support stand of FIG. 1 illustrating variations in the top member.
Figure 5:
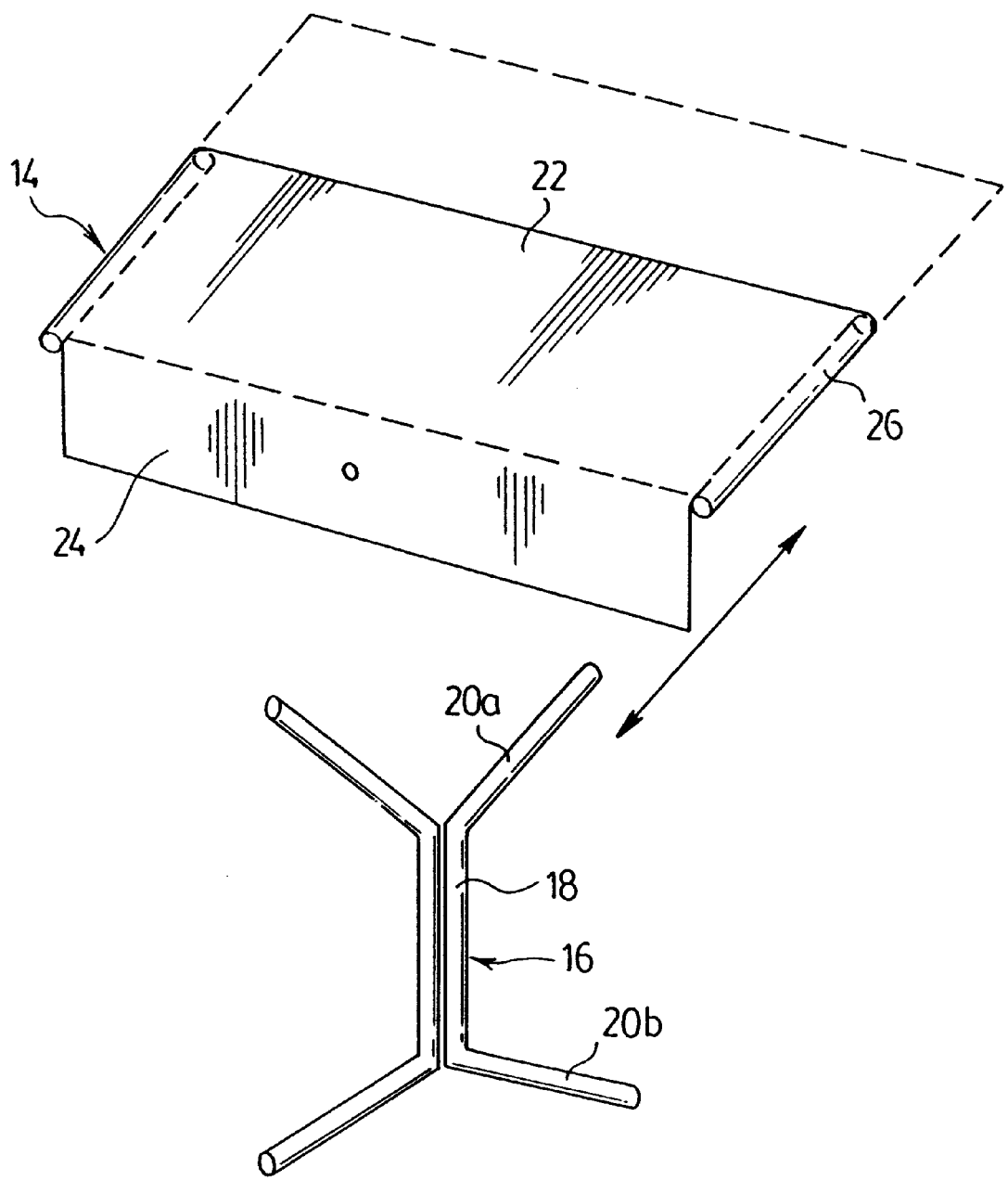
FIG. 5 is a perspective view of the support stand FIG. 1 illustrating the first step in the assembly of the support stand.

As illustrated in FIG. 4, the angle between the first section 22 and second section 24 of the top members 14 may also be varied to match the angle between the top member supporting extension 20a and vertical central portion 18 of the support member 16 to which the top member 14 is to be slidingly engaged.

While the first preferred embodiment illustrates the engaging means 26 as a sleeve to slide over the top member supporting extension 20a of the support member 16, other means of engagement are also contemplated. The engaging means 26 could be provided as a member to slide interiorly of the top member supporting extension, if the top member supporting extension were provided as a channel member, capable of containing the engaging means within the interior thereof. In addition, while in the first preferred embodiments, the engaging means 26 is intregal with the top member 14, a separate engaging means 26, attachable to the top member 14, is also contemplated. As noted above, the top member 14 illustrated in the preferred embodiment has a generally planar first section 22. Depending upon the application and the requirement, this first section 22 may be provided with another shape, such as a downwardly curve or concave shape, etc. In order to provide for the proper lateral support, it is preferred if the second section 24 remains planar, so that the two surfaces of the second sections 24 may engage one another and provide for the lateral support for the support stand 10.

Figure 6:
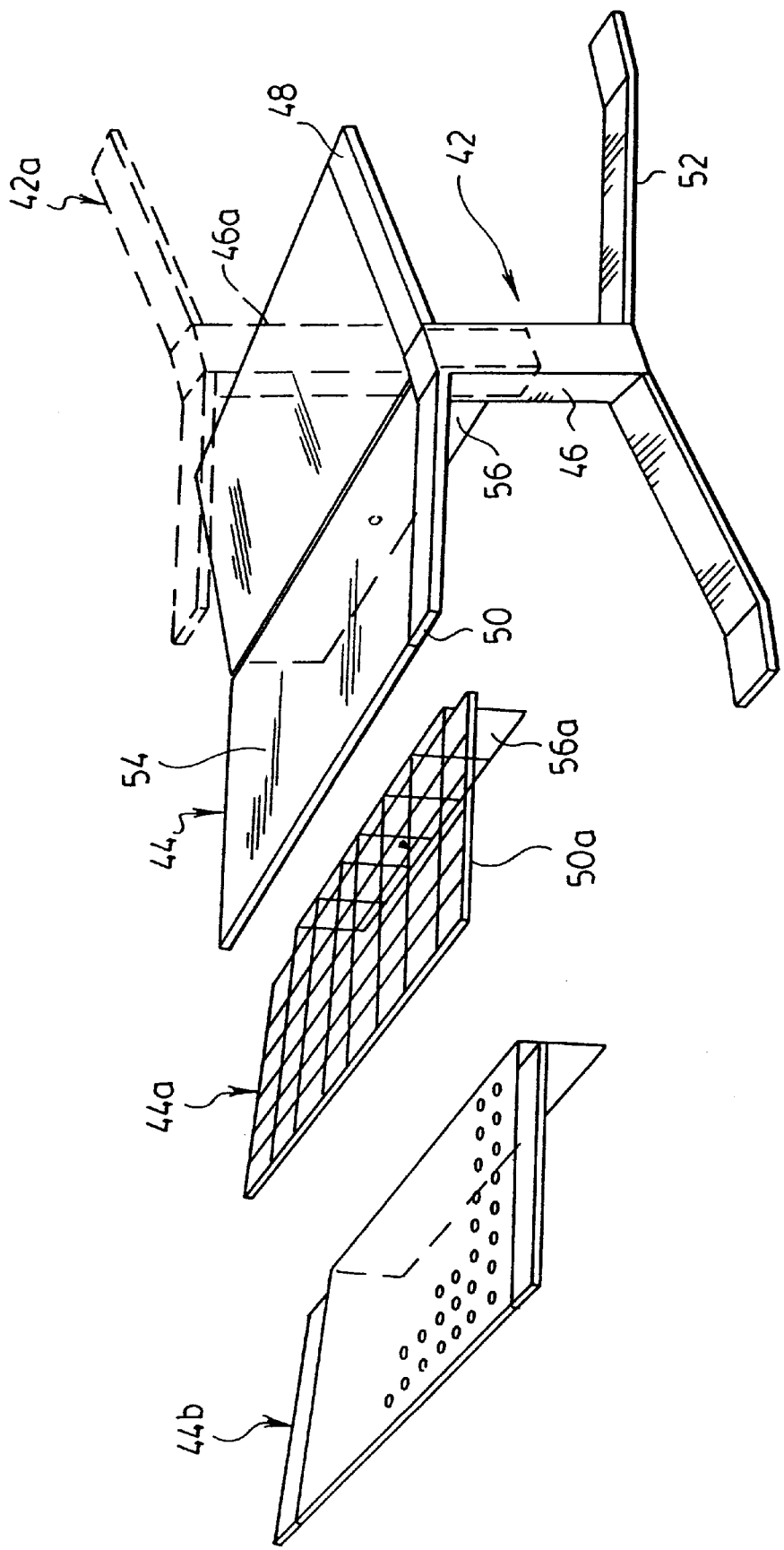
FIG. 6 is an exploded perspective view of a second embodiment of, a support stand of the present invention.

A second embodiment of a support stan d of the present invention is illustrated in FIG. 6 generally indicated by the numeral 40. Support stand 40 of this embodiment has two support legs 42 and top members 44. In this embodiment of the support stand, the generally vertical central region 46 has a box shape with the top member supporting extensions 48 extending from either side at the top thereof. While in the figures, the central region is illustrated as having a hollow box shape, other shapes such as round, hexagaonal, etc., are also contemplated, so long as they permit the nesting of the support stand as described below.

The top member supporting extensions 48 in this embodiment are shaped as a channel member with one open side to receive the engaging means 50 of the top member 44. At the lower end of the central region 46 there are provided suitable feet 52 for the support leg. The top member 44, similar to the first embodiment, is provided with a first section 54 to form the top surface of the support table and a second section 56 connected along one edge to an edge of the first section 54. once again, the angle between the first section 54 and second section 56 is similar to the angle between the vertical central portion 46 and top member supporting extensions 48 . The support table 40 of this embodiment is assembled in a similar manner to that of the first embodiment.

As further illustrated in FIG. 6, this embodiment of the support table has particular utility as merchandise display racks, etc. The nature of the top member 44 may be varied depending upon the requirements of the specific application. Thus, as illustrated in the Figures, the top member 44 may be constructed of a solid material such as metal, plastic, etc. It may also be constructed of an open mesh material 44A, or a perforated metal material 44B. In addition, the support table of this embodiment may also be stackable as outlined in FIG. 6. A second support leg 42a may be provided with an extending central region 44a. This extended central region 44a is provided with a lower end which is capable of being received within the central region 46 of the first support leg 42. In this way a multi-level support rack may be provided by stacking support legs one on top of the other and sliding the top member into the support leg in a manner as described above.

Figure 7:
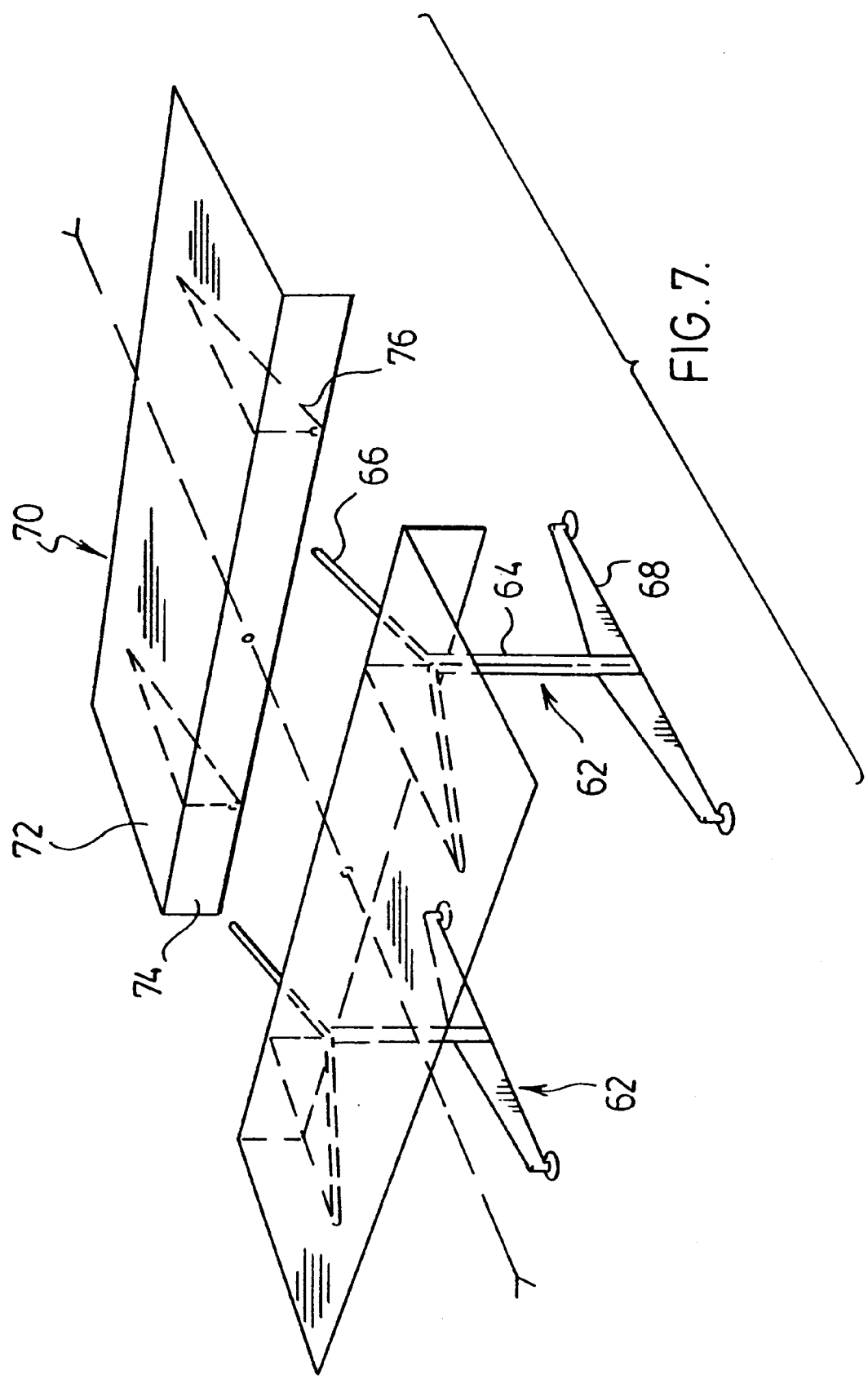
FIG. 7 is an exploded perspective view of a third embodiment of a support stand of the present invention.

A third embodiment of the support table, according to the present invention, is illustrated in FIG. 7 generally indicated by the numeral 60. Once again, this support table 60 is provided with two support legs 62 having a generally vertical central region 64 and top member supporting extensions 66 and suitable support feet 68. Top member 70 has first section 72 and second section 74 joined to one another along their edges to provide for the top support surface for the support table 60. In this embodiment, the engaging means 76 are located in the interior of the ends of the top surface 70. The engaging means 76 are a sleeve attached to the top surface interior of the ends to receive the top member supporting extensions 66. The support table 70 of this embodiment is assembled in a similar manner to that of the previous embodiment and is of particular utility as a table or desk.

Figure 8:
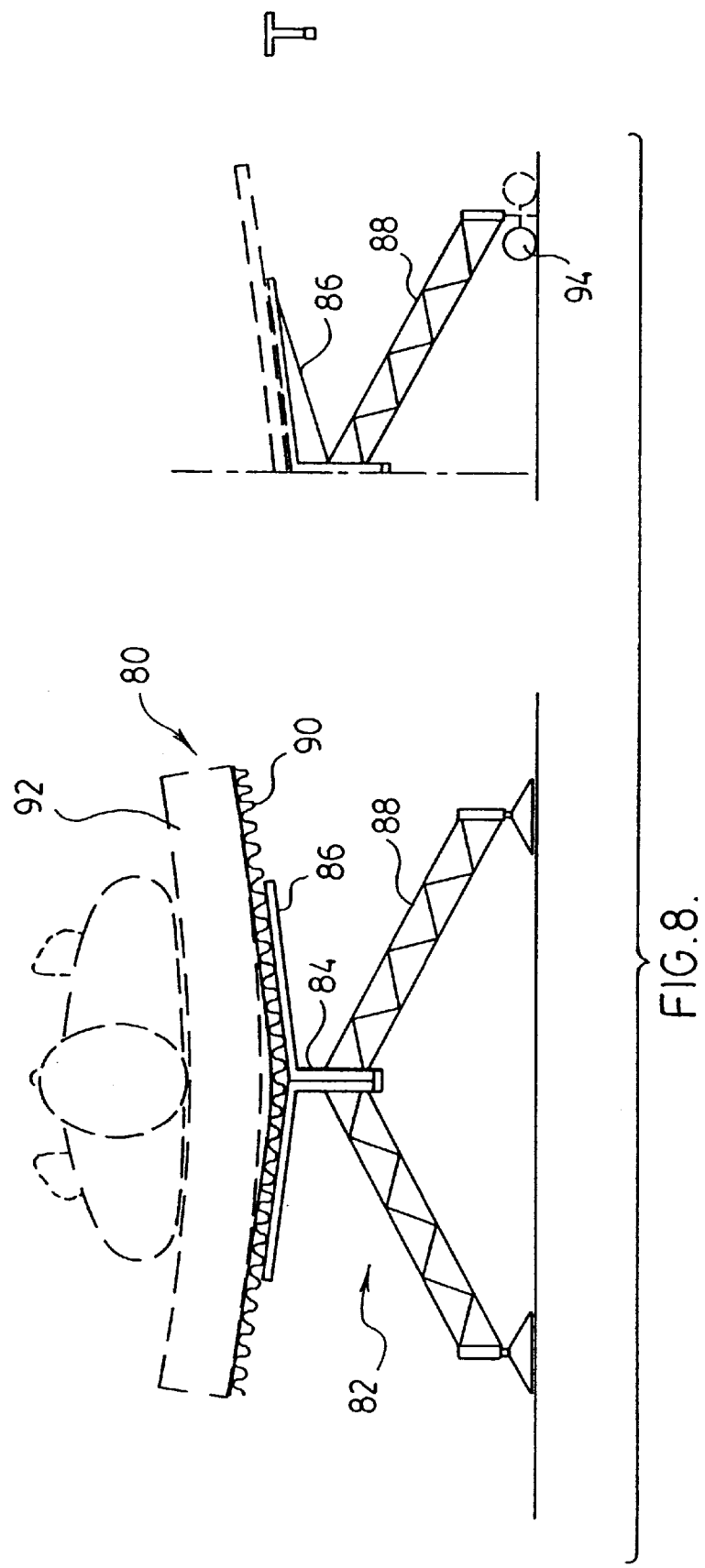
FIG. 8 is an end elevation view of a fourth embodiment of a support stand of the present invention.

FIG. 8 illustrates yet another embodiment of a support table of the present invention having particular utility as a temporary bed, for example for use in a hospital or other institutional setting. The support table 80 has two support legs 82, with a central region 84, top member supporting extension 86, and support feet 88. The top surface 90 attaches to the support legs 82 in a similar manner to the other embodiments and a mattress 92 or other suitable padding is placed on the top surface 90 to provide support for a person. Preferably, in order to provide for proper support of a person, the engaging means are located interior of the ends of the top surface 90 similar to the embodiment illustrated in FIG. 7. The support table 80 may also be provided with casters 94 on the ends of the support feet 88 to allow for movement of the support table 80.

Figure 9:
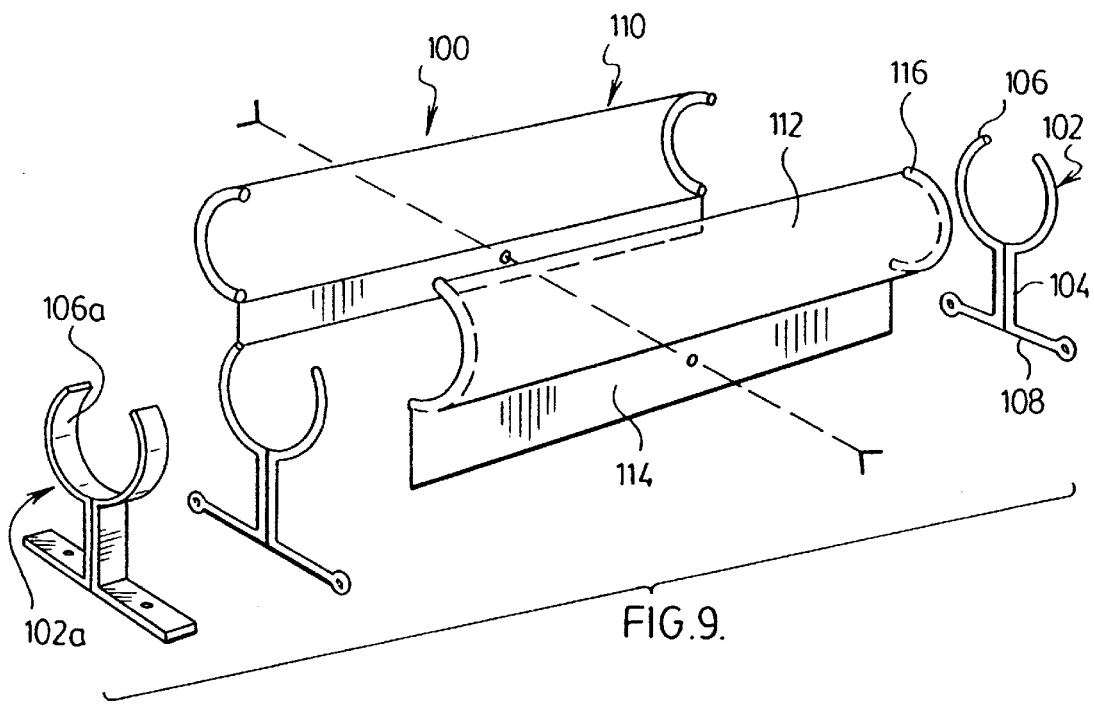
FIG. 9 is an exploded perspective view of a fifth embosiment os a support stand of the present invention.

FIG. 9 illustrates yet another embodiment of the support stand of the present invention for particular utility as a support for pipelines and other pipes, particularly where the joints between two sections of pipe must be supported. The support stand 100 has two support legs 102, each of the legs 102 having the vertical central region 104, arch shaped top member supporting extensions 106 extending from the top of the central region 104 and support feet 108 extending from the lower end of the central section 104. The top member 110 has a first curve shaped surface 112 having a radius of curvature matching the radius of curvature of the arch shaped top member supporting extensions 106 and a generally planar second section 114 extending downward from the lower edge of the curved first section 112. Engaging means 116 are provided at either end of the top of member 110. In the one embodiment illustrated in FIG. 9, the support legs 102 are constructed similar to the first embodiment having two support members attached to one another along the central regions. The support feet 108 are capable of being permanently attached to a surface for example, a concrete pad located under the pipeline joint to be supported. In the embodiment illustrated, this is accomplished by providing holes 118 which can be used to bolt the support feet 108 to the concrete pad, although others means to accomplish this would be readily apparant to those skilled in the art. The support legs 102 may be constructed of a generally circular material in which case the engaging means 116 will be circular sleeves which slide over the circular material. A second embodiment of a support leg of this support stand is illustrated as 102*a* in FIG. 9. This support leg 102*a* is constructed of generally planar bar stock shaped to form the support leg 102*a*. With this embodiment, the engaging means 116 would be provided as a sleeve having a box shaped cross section to slide over the top member supporting extension 106*a* of the support leg 102*a*.

Figure 10:
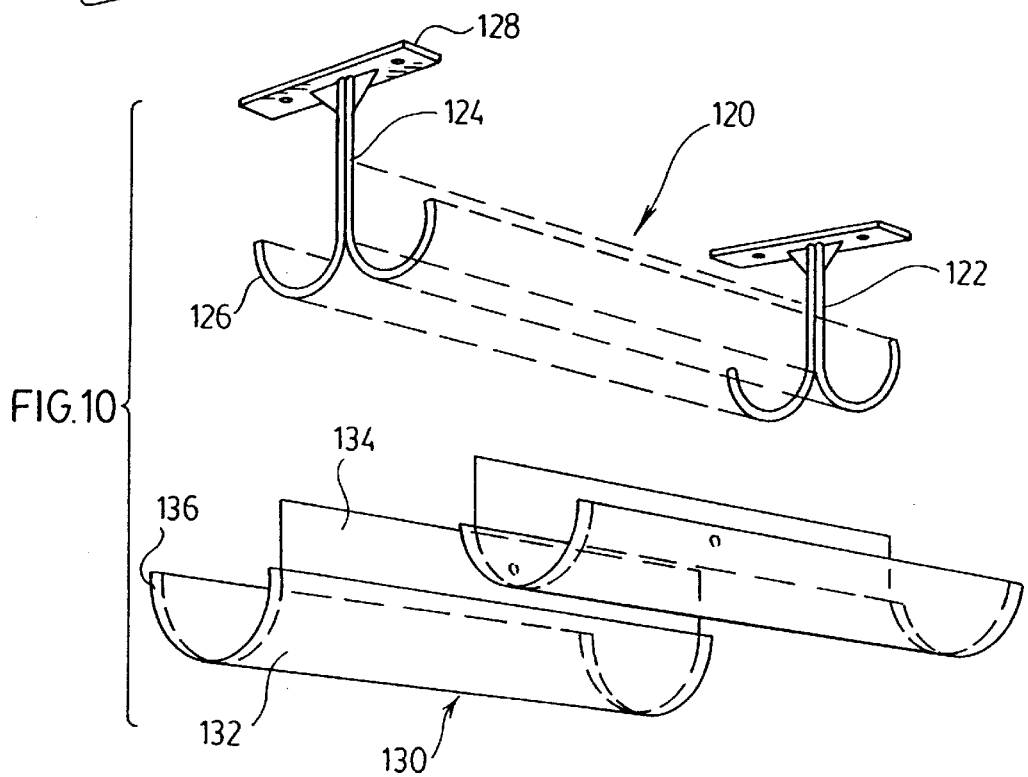
FIG. 10 is an exploded perspective view of a sixth embodiment of a support stand of the present invention.

FIG. 10 illustrates yet another embodiment of a support stand of the present invention which is of particular utility for suspending and supporting services, such as wiring conduits, plumbing runs, etc. from a ceiling. This embodiment of the support stand 120 has two support legs 122 with generally vertical central regions 124 and circular top member supporting extensions 126 which extend outwardly and upwardly from the lower end of the region 124. The upper end of the central region 124 is provided with a suitable support foot 126 for attaching the support leg 122 to a ceiling. The top members 130 have a first section 132 with a circular trough shape to match the dimensions of the circular extension 126 and a generally planar second section 134 attached along one edge to an edge of the circular first section. Suitable engaging means 136 are provided at either end of the top member 130. As illustrated in FIG. 10, when the support stand is assembled two circular shaped troughs are provided on either side of the support stand for holding and supporting services, such as wiring conduits, etc. spaced away from the ceiling.

The support stands illustrated in the figures are preferably constructed of a suitable metal to provide for the required rigidity to the support stand, especially for the supporting of heavier loads. However, depending upon the application, materials other than metal may be utilized, either alone or in combination with other materials, including metal. For example, the support members may be constructed of metal, while the top members may constructed of a suitable rigid plastic or fiberglass material.

The support stand of the present invention provides the benefit of being simple to manufacture. This is particularly the case for the embodiments utilizing two support members to form the support leg, as only two pieces are required to construct the support table, one piece being the support member and the other piece being the top member. As illustrated in the preferred embodiment, four such support members are joined together, in pairs, to form the support legs, while two top members are utilized to form the top surface of the support stand.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A support stand which is economical to manufacture, the support stand comprising at least two support legs for the support stand, each of the support legs comprising a vertical central portion with top member supporting extensions extending outwardly from either side of the vertical central portions, the support stand also including two top members which provide the top surface of the support stand, each of the top members having a first section having engaging means at or adjacent either end thereof for engaging with the top member supporting extensions of the support leg, the top member being provided with a second section attached along an edge to the first section, the second section being orientated to lie in a plane with the central portions of the support legs when the engaging means are engaged with the top member supporting extensions of the support legs, one of the two top members engaging the top member supporting extension on one side of each of the support legs, the other top member engaging the top member supporting extensions of the second side of each of the support legs, whereby when the top members are engaged with the support legs, the two second sections abut one another along their surfaces, and may be releasably connected to one another to provide for lateral support for the support stand.

2. A support stand as claimed in claim 1 wherein the support legs are each comprised of two support members being co-joined to form the support leg for the support stand, each of the support members comprising a generally vertical central portion with lateral extensions extending from the ends of the central support section, the support members being co-joined by joining the vertical central portions to one another to result in the lateral extensions extending either side of the joined vertical central portions.

3. A support stand as claimed in claim 1 wherein the top member supporting extension are lateral members extending angularity outwardly from either side of the vertical central portion of the support leg.

4. A support stand as claimed in claim 3 wherein the engaging means are sleeves for sliding over the top member supporting extensions.

5. A support stand as claimed in claim 4 wherein the engaging means are located at the ends of the first section of the top member.

6. A support stand as claimed in claim 4 wherein the engaging means are located on the first section interior of the ends.

7. A support stand as claimed in claim 3 wherein the engaging means are channel members having an open side for receiving the top member supporting extensions in the interior thereof.

8. A support stand as claimed in claim 7 wherein the engaging means are located at the ends of the first section of the top member.

9. A support stand as claimed in claim 1 wherein the top member supporting extensions are arch shaped extending upwardly from the end of the vertical central portion and the first section of the top member has a curve shaped surface having a radium of curvature to match the radium of curvature of the arch shaped top member supporting extensions.

10. A support stand as claimed in claim 9 wherein the engaging means are sleeves for sliding over the top member supporting extensions.

11. A support stand as claimed in claim 10 wherein the engaging means are located at the ends of the first section of the top member.

12. A support stand for supporting a pipeline joint, the support stand comprising two support legs, each of the support legs having a vertical central portion, arch shaped top member supporting extensions extending outwardly from either side at the top of the vertical central portion and support legs extending outwardly from the lower end of the vertical central portion, the support legs having a means for attachment to a support surface, the support stand further including two top members for containing and supporting a pipeline point, each of the top members having a first arch shaped section with a radium of curvature matching the radium of curvature of the top member supporting extensions and engaging means on either end of the first section, the engaging means comprising a sleeve for sliding over the top member supporting extensions, the top member further including a generally planar second section connected along an edge to an edge of the first section, the second section being oriented to lie in a plane with the vertical central portion when the top member supporting extensions are contained within the engaging means, the top members being attached to the support legs on either side by sliding the top member supporting extensions into the engaging means until the second sections of the two top members abut each other and lie in a plane with an interior of the vertical central portions of the support legs.

\* \* \* \* \*